(12) United States Patent
Copeland

(10) Patent No.: US 9,109,701 B1
(45) Date of Patent: Aug. 18, 2015

(54) PIPE JOINT GASKET AND METHOD OF MAKING SAME

(71) Applicant: McWane Global, Birmingham, AL (US)

(72) Inventor: Daniel A. Copeland, Bessemer, AL (US)

(73) Assignee: MCWANE INC., Birmingham, AL (US)

( * ) Notice: Subject to any disclaimer, the term of this patent is extended or adjusted under 35 U.S.C. 154(b) by 2 days.

(21) Appl. No.: 14/056,612

(22) Filed: Oct. 17, 2013

(51) Int. Cl.
*F16J 15/12* (2006.01)
*F16L 21/03* (2006.01)

(52) U.S. Cl.
CPC ............... *F16J 15/121* (2013.01); *F16L 21/03* (2013.01)

(58) Field of Classification Search
CPC .............................. F16J 15/0887; F16J 15/061
USPC ......... 277/602, 603, 606, 607, 608, 609, 615, 277/616, 619, 620, 624, 626, 627
See application file for complete search history.

(56) References Cited

U.S. PATENT DOCUMENTS

| 3,724,880 | A | * | 4/1973 | Seiler | 285/105 |
| 3,963,298 | A | * | 6/1976 | Seiler | 277/625 |
| 4,229,026 | A | * | 10/1980 | Seiler | 285/105 |
| 5,058,907 | A | * | 10/1991 | Percebois et al. | 277/626 |
| 5,067,751 | A | * | 11/1991 | Walworth et al. | 285/105 |
| 5,295,697 | A | * | 3/1994 | Weber et al. | 277/616 |
| 5,464,228 | A | * | 11/1995 | Weber et al. | 277/615 |
| 5,476,290 | A | * | 12/1995 | Bergmann et al. | 285/110 |
| 6,062,611 | A | * | 5/2000 | Percebois et al. | 285/374 |
| 6,688,652 | B2 | * | 2/2004 | Holmes et al. | 285/105 |
| 2002/0106923 | A1 | * | 8/2002 | Copeland et al. | 439/192 |
| 2004/0075217 | A1 | * | 4/2004 | Copeland | 277/314 |
| 2005/0218605 | A1 | * | 10/2005 | Walworth et al. | 277/609 |
| 2013/0043656 | A1 | * | 2/2013 | Copeland et al. | 277/314 |

* cited by examiner

*Primary Examiner* — Vishal Patel
*Assistant Examiner* — L. Susmitha Koneru
(74) *Attorney, Agent, or Firm* — C. Brandon Browning; Maynard Cooper & Gale

(57) ABSTRACT

A gasket for preventing separation of interconnected pipes including a compressible body having a plurality of metal segments partially embedded therein. Each of the metal segments includes an inner surface having at least one tooth configured for engaging a spigot end of a pipe and an outer surface having an arm with a substantially flat portion arranged adjacent to a forward section of a retainer groove of the gasket, the substantially flat portion being configured for displacing the segment radially and axially upon insertion of the spigot end into a bell end of the other pipe thereby decreasing the spigot insertion force required to seat the spigot end within the bell end and the gasket.

20 Claims, 6 Drawing Sheets

PIPE JOINT GASKET AND METHOD OF MAKING SAME

FIELD OF THE INVENTION

The present invention is directed to a pipe joint gasket and more particularly to a pipe joint gasket including an arrangement of metal segments configured for decreasing spigot insertion force during pipe joint formation and preventing the separation and fracturing of interconnected, telescoping pipes during fluid pressurization.

BACKGROUND OF THE INVENTION

Pipe joint gaskets including anti-slip segments for preventing the separation of interconnected, telescoping pipes in applications where a fluid such as water for fire mains is held under high pressure are known in the art. Exemplary gaskets are described in U.S. Pat. Nos. 5,295,697 and 5,464,228 in which a rubber gasket, serving as a fluid seal, includes toothed metal segments spaced uniformly around its inner perimeter. The toothed metal segments bite into the outer surface of the spigot of the inserted pipe and prevent withdrawal of the inserted pipe from a bell end of the other pipe. The metal segments pivot about a retainer bead in the bell end of the other pipe to allow the spigot end to be inserted into the bell end of the other pipe while preventing withdrawal of the inserted pipe under high fluid pressure conditions.

A shortcoming of such gaskets is that during fluid pressurization of the interconnected pipes, excessive axial thrust force generated by the resulting hydrostatic pressure can cause the metal segments to over-rotate about the retainer bead resulting in destructive radial loads being exerted through the metal segments upon the inner axial surface of the bell end and the outer axial surface of the spigot end. In many instances, these radial loads are great enough to fracture the spigot and bell ends of the pipes. An additional shortcoming of such gaskets is that during insertion of the spigot into the bell end, the toothed metal segments bite into the spigot causing the gaskets to translate axially with the spigot as it is inserted farther into the bell end. In these instances, the gaskets may end up improperly positioned within the bell end thereby failing to form the requisite seal between the bell end and spigot. Also, when a gasket is improperly positioned, the force required to insert the spigot end into the bell end may increase substantially.

SUMMARY OF THE INVENTION

The present invention is directed to a gasket for decreasing the amount of force required to insert a spigot end of a plastic pipe, such as PVC pipe, into a bell end of a metal pipe, such a ductile iron pipe, and preventing the separation and fracturing of the resulting pipe joint. According to one aspect of the invention, there is provided to a pipe gasket including a compressible body having a heel portion including a conical inner surface, a front face and an edge formed by the intersection of the conical inner surface and the front face. A plurality of metal segments are at least partially embedded in the compressible body and circumferentially spaced therein. The metal segments serve to restrain the joint and, in particular, prevent the spigot end of the plastic pipe from retreating out of the bell end of the metal pipe upon pressurization of the joint. At least one metal segment of the plurality of metal segments includes a nose portion and at least one tooth extending radially inward through the conical inner surface, the nose portion terminating at about the edge of the heel portion. The at least one tooth may include a pair of coplanar-arranged teeth extending from a substantially flat, inner face arranged parallel to the conical inner surface. Preferably, the nose portion is formed by a pair of surfaces arranged to form an angle of less than about 25°, more preferably bout 15° to about 25° and includes an outer surface embedded in the compressible body, the outer surface extending distally from the edge and forming with the inner face an angle of about 15° to about 25°. The at least one metal segment may include at least one protrusion extending radially outward from an embedded outer surface thereof.

According to another aspect of the invention there is provided a method of forming a seal between a spigot end of a first pipe and a bell end of a second pipe, the bell end including a throat and a gasket receiving groove. The method includes providing a gasket having a compressible body with a heel portion, a sealing portion and a plurality of metal segments at least partially embedded in the heel portion, at least one of the metal segments of the plurality of metal segments including an outer radial surface, an inner radial surface, a nose portion formed by an intersection of the outer radial surface and the inner radial surface and at least one tooth extending radially inwardly from the inner radial surface. The method further includes placing the gasket into the gasket receiving groove, inserting the spigot end into the bell end and through the gasket, followed by withdrawing the spigot end a distance through the gasket and wedging the nose portion between the throat and the spigot end. Withdrawing the spigot end, creates distinct loads paths within the at least one metal segment that extend between the at least one tooth and the throat, through the nose portion and between the throat and the spigot end and/or between the at least one tooth and the throat. Withdrawing the spigot end may also cause the at least one metal segment to translate axially.

According to yet another aspect of the invention there is provided a method of forming a seal between a spigot end of a first pipe and a bell end of a second pipe, the method including providing a gasket having heel portion and a metal segment embedded therein, the metal segment including a tooth extending radially inward and a nose, placing the gasket into a gasket receiving groove of the bell end, inserting the spigot end into the bell end and through the gasket, followed by moving the metal segment from a first position where the nose is not located between the spigot end and a throat of the bell end to a second position where the nose is located between the throat and the spigot end. The nose may be moved into the second position without rotating the metal segment about a portion of the bell end.

DETAILED DESCRIPTION OF PRESENTLY PREFERRED EMBODIMENTS

Figure 5:
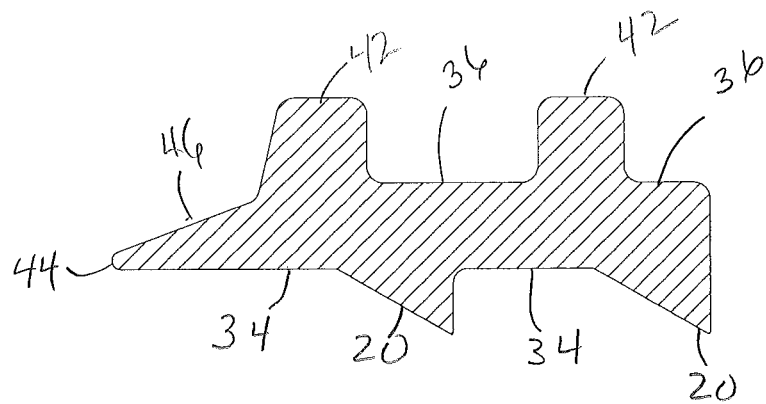
FIG. 5 is a sectional view of an alternative metal segment in accordance with the present invention.
Figure 6:
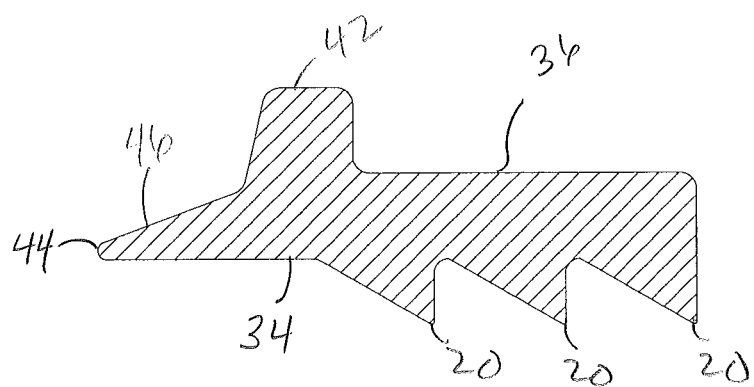
FIG. 6 is a sectional view of an alternative metal segment in accordance with the present invention.
Figure 7:
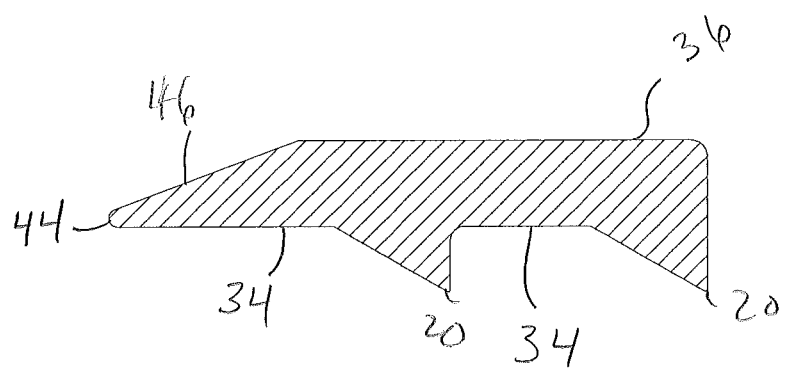
FIG. 7 is a sectional view of an alternative metal segment in accordance with the present invention.
Figure 8:
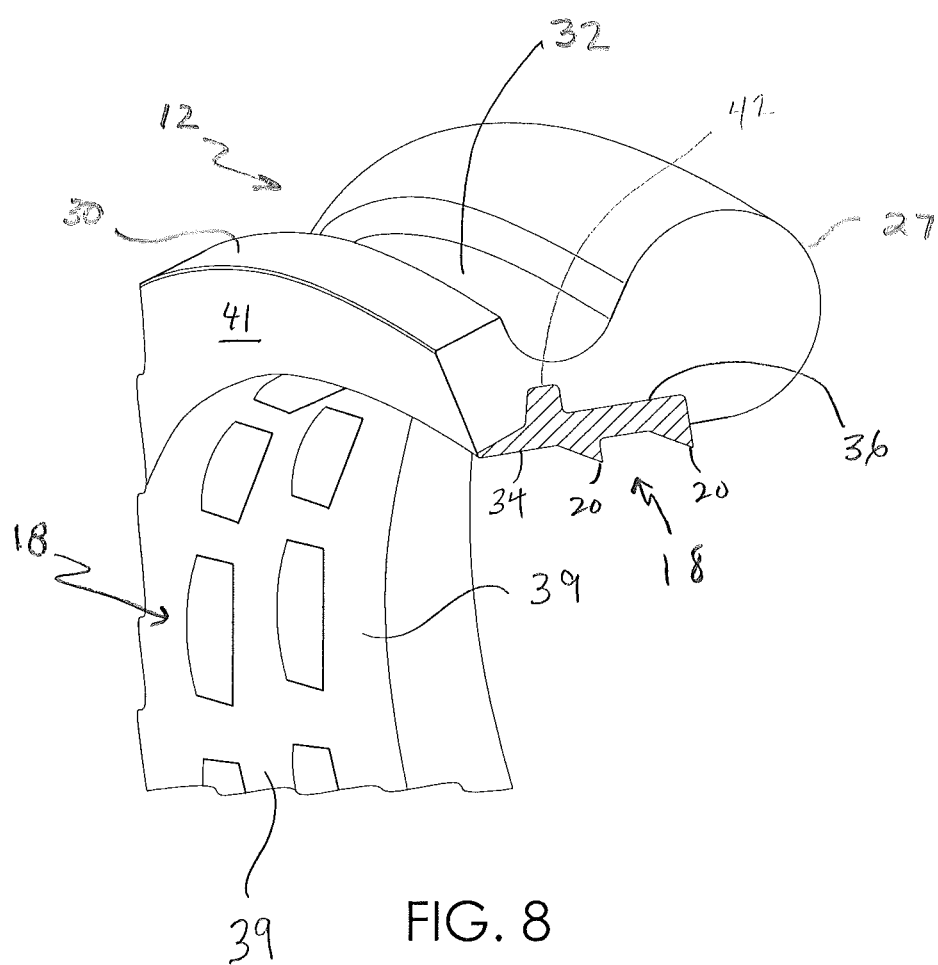
FIG. 8 is a perspective view of the gasket of FIG. 1 showing the placement of metal segments around its periphery.

FIGS. 1 through 4 depict a fragmented cross-sectional view of a bell end 10 of a metal pipe using a gasket 12 of the present invention, a spigot end 14 of a plastic pipe entering the pipe bell and the operation of gasket 12 upon the fluid pressurization of a pipe joint 16 created between bell end 10 and spigot end 14. In particular, these figures illustrate the arrangement and operation of metal segments 18 in gasket 12 relative to bell end 10 and spigot end 14 during the formation and fluid pressurizing of joint 16. FIGS. 5 through 7 depict variations of the metal segments that may be used in gasket 12. FIG. 8 is provided to show the circumferential arrangement and spacing of metal segments 18 throughout gasket 12.

Figure 1:
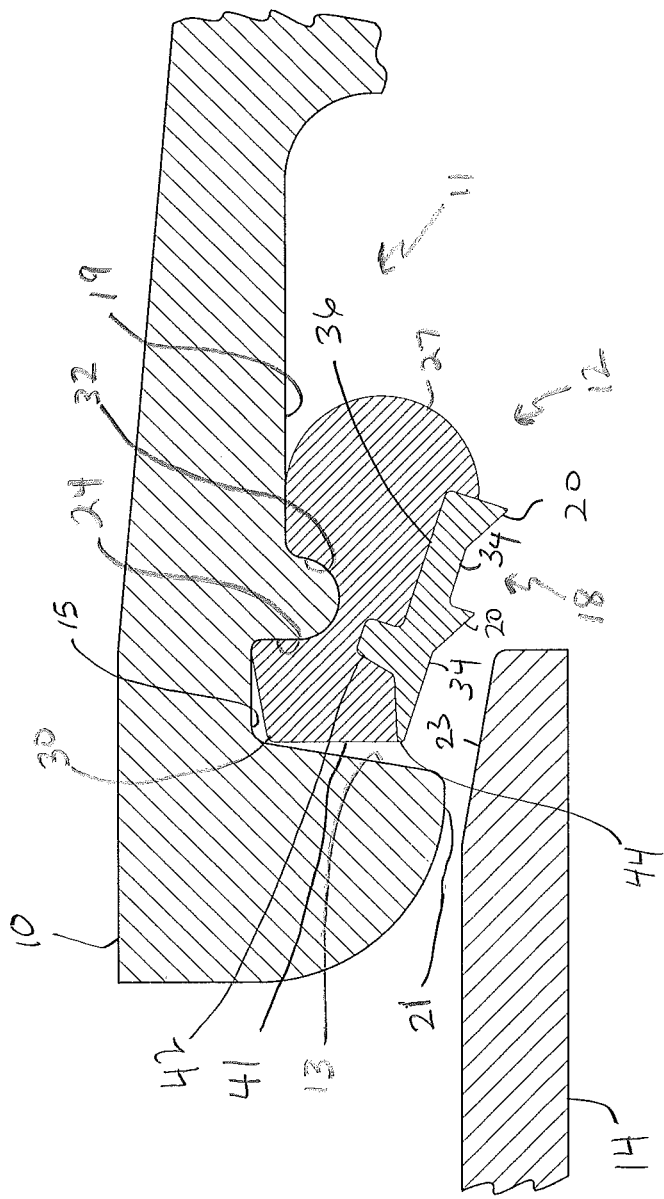
FIG. 1 is a fragmented cross-sectional view of a bell end of one pipe containing a gasket in accordance with a preferred embodiment of the present invention and a spigot end of another pipe entering the pipe bell.
Figure 2:
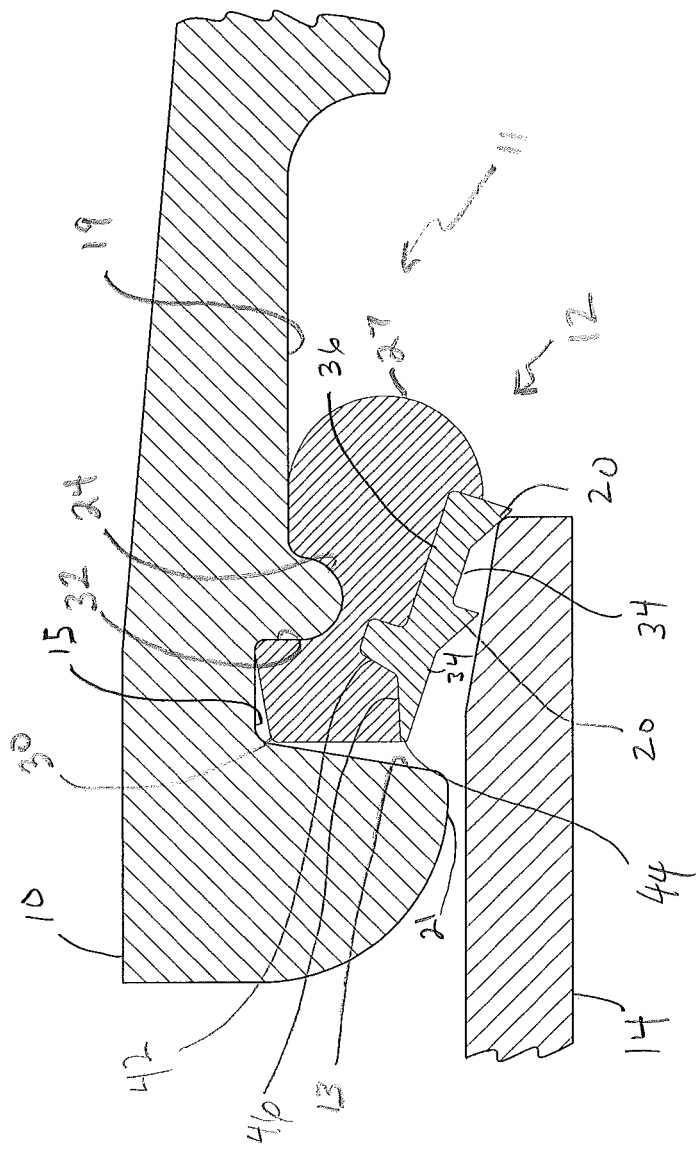
FIG. 2 is a fragmented cross-sectional view of the bell end, the gasket and the spigot end of FIG. 1 illustrating insertion of the spigot through the gasket.

Generally, gasket 12 is arranged for inhibiting leakage about joint 16 between the inside walls of bell end 10 and the outside wall of spigot end 14. More particularly, as illustrated in FIGS. 1 and 2, the inner surface of bell end 10 includes a retainer groove 11 bounded by a radially extending front wall 13, an axially extending retainer wall 15, and an axially extending sealing wall 19. Extending radially inward from retainer wall 15 is a retainer shoulder 24. Retainer shoulder 24 may be arranged as a bead, as illustrated in the figures, or as a corner or edge as depicted in U.S. Pat. No. 6,688,652. Gasket 12 is positioned within retainer groove 11 with an outer face thereof being arranged adjacent to axially extending retainer wall 15, a heel portion 30 arranged between front wall 13 and retainer shoulder 24, and a sealing bulb portion 27 arranged against sealing wall 19. The outer face of gasket 12 includes an annular groove 32 formed between heel portion 30 and sealing portion 27. Annular groove 32 is arranged to receive retainer shoulder 24 and interact there with.

Inserted into gasket 12 is a plurality of substantially metal segments 18. As depicted in FIG. 8, segments 18 are spaced apart equally in a circumferential direction around the periphery of gasket 12. Metal segments 18 are firmly vulcanized into radial grooves found within heel portion 30 in gasket 12. The number of metal segments 18 inserted into gasket 12 varies depending upon the anticipated fluid pressure at joint 16 and the size of the pipes involved.

Metal segments 18 are configured for decreasing the spigot insertion forced required to seat the spigot end within the bell end and gasket and decrease the radial load exerted between the joined pipes upon pressurization thereof. To that end, referring to FIGS. 1 through 7, each metal segment 18 includes a substantially flat, inner surface 34 and a substantially flat outer surface 36. Inner surface 34 and outer surface 36 are arranged parallel to an inner radial face 39 of heel portion 30. In some instances, inner surface 34 of segment 18 may be exposed thereby forming a portion of inner radial face 39 of heel portion 30. In other instances, inner surface 34 may be embedded within the gasket material of gasket 12. Two or more teeth 20 are arranged to extend radially inwardly from inner surface 34. In each embodiment, at least one tooth is provided at a proximal end of metal segment 18, protruding through sealing portion 27. Teeth 20 are arranged to be planar meaning the acutely pointed tips of the teeth are coplanar. Thus, the teeth are not arranged in an arc. During formation of joint 16 and the subsequent pressurization thereof, this feature inhibits rotation of the metal segments between the bell end 10 and spigot end 14, while promoting the translation of segment 18 toward front wall 13.

Outer surface 36 of segment 18 may include one or more substantially rectangular protrusions 42 extending radially outward there rom and into the gasket 42. Protrusions 42 act to anchor segment 18 within gasket 12 and to transfer axial loads from segment 18 to gasket 12. As depicted in FIGS. 1 through 4 and 6, when segment 18 includes a single protrusion 42, the protrusion extends from a distal portion of outer surface 36 and is located adjacent to a nose portion 44 of the segment which is formed by the intersection of inner surface 34 and an angled surface 46 extending radially outwardly from the nose portion towards protrusion 34. Nose portion 44 terminates at a corner of heel portion 30 at the intersection of inner radial face 39 and a distal face 41 of gasket 12. Referring to FIG. 5, segment 18 may include two protrusions 42 with one protrusion extending from a distal portion of outer surface 36 that located adjacent to nose portion 44 and a second protrusion, spaced apart from the first protrusion and located distally thereto. Referring to FIG. 7, segment 18 may include no protrusions. In this instance, angled surface 46 and outer surface 36 intersect.

Figure 3:
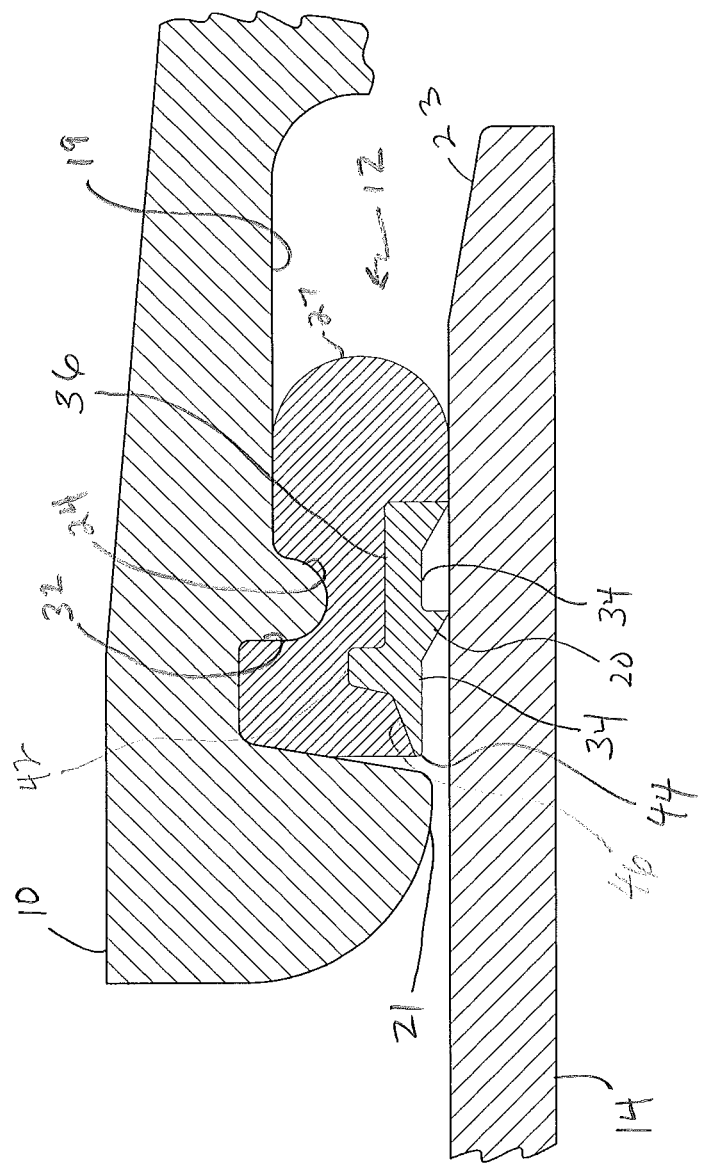
FIG. 3 is a fragmented cross-sectional view of the bell end, the gasket and the spigot end of FIG. 2 illustrating the spigot end fully inserted to the pipe bell.

Referring to FIGS. 1 and 2, as joint 16 is assembled, a throat 21 of bell end 10 guides spigot end 14 until a beveled end 23 of spigot end 14 contacts a first tooth of teeth 20. As spigot end 14 continues to slide through gasket 12, retainer shoulder 24 engages with annular groove 32 of gasket 12 thereby preventing the gasket from dislodging from retainer groove 11. The wedging action between beveled end 23 and the conical inner radial face 39 compresses sealing bulb portion 27 between spigot end 14 and sealing wall 19 and thereby creating a seal between the interconnected pipes and pressing teeth 20 into or against spigot end 14. Referring to FIG. 3, when spigot end 14 is fully inserted through gasket 12 and into bell end 10, with beveled end 23 inserted fully passed sealing bulb portion 27, all teeth 20 of segment a 18 are in contact with spigot end 14.

Contrary to prior art gaskets that include embedded metal locking segments, the compression of sealing bulb portion 27 of the present invention occurs with essentially no rotation of metal segment 18 around retainer shoulder 24. Instead, the interaction of beveled end 23 and co-planar arranged teeth 20 displaces segment 18 substantially radially outwardly rather than rotationally around a bead or shoulder. This causes foot portion 30 to be compressed upon insertion of the spigot end 14 into gasket 12 together with sealing bulb portion 27.

Figure 4:
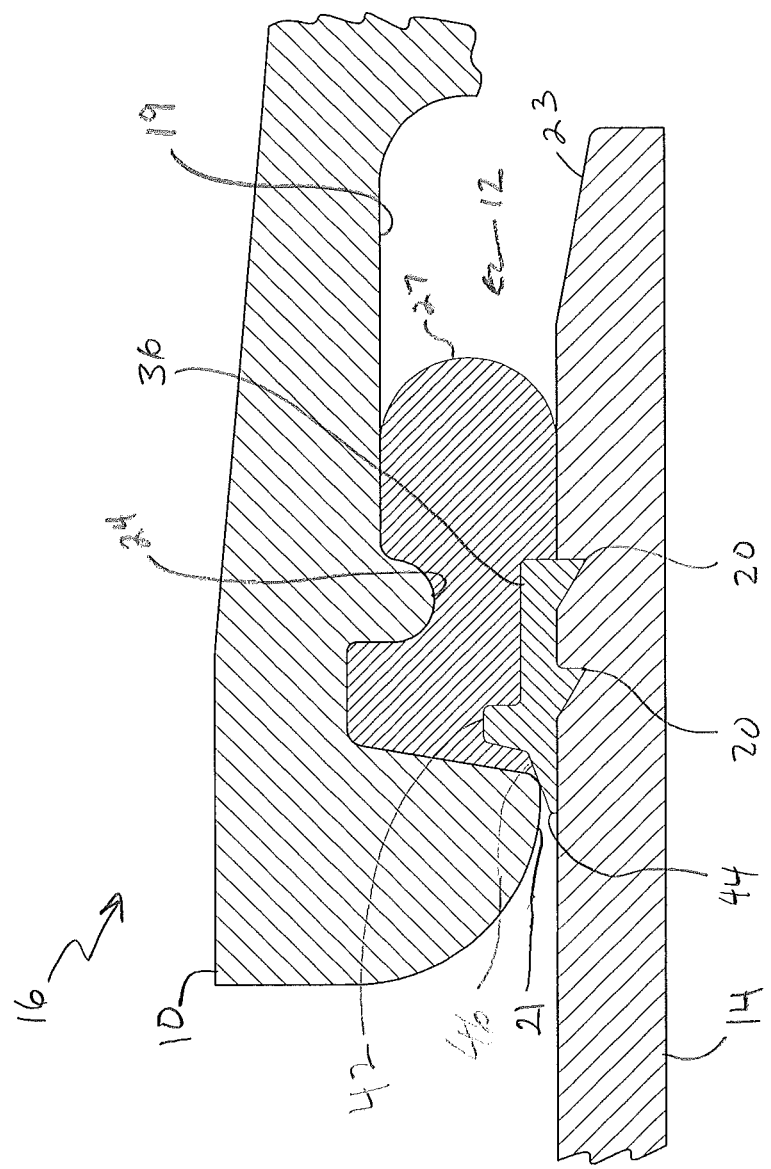
FIG. 4 is a fragmented cross-sectional view of the bell end, the gasket and the spigot end of FIG. 3 illustrating the arrangement of the gasket following pressurization of the interconnected pipes.

Referring to FIG. 4, upon pressurization of joint 16, teeth 20 engage with spigot end 14 by friction or by penetrating into spigot end 14 a short distance. This occurs as the axial load created by the tendency of the pipes to want to separate when under pressure is transmitted radially and axially by teeth 20 and gasket 12 to and between front wall 13 of retainer groove 11 and spigot end 14 thereby resisting pipe separation. As the pressure within joint 16 is increased to normal operating pressures, segment 18 translates distally towards front wall 13 causing the compression of foot portion 30 as it is pressed against front wall 13. When this occurs, nose portion 44 advances into throat 21. Advancement of segment 18 into and through throat 21 is arrested by the engagement of angled surface 46 with a portion of throat 21 of bell end 10 that is located adjacent to the intersection of throat 21 and front wall 13 of retainer groove 11. The axial advancement of segment 18 into throat 21 forms a load path between teeth 20 and the throat. In this manner, segment 18 become wedged between the throat of bell end 10 and spigot end 14 and the axial forces generated by the pressurization of the pipes are transmitted axially and radially through nose portion 44 to and between the pipes as segment 18 is urged distally into throat 21. The wedging of segment 18 between the throat of bell end 10 and spigot end 14 forms a radially extending load path through nose portion 44 and between throat 21 and spigot end 14. Because the radial load is transferred through nose portion 44 and nose portion 44 is located distally to teeth 20, the amount of radial load exerted by teeth 20 into spigot end 14 is less than the radial load exerted by teeth of prior gaskets that are designed to create load paths between the teeth of the segments and the front wall, retainer shoulder and/or retainer wall of the retainer groove. Such designs have been shown to cause the teeth to over-penetrate the spigot. Segments 18 of the present invention overcome this shortcoming of the prior art by shifting a significant portion of the radial forces created by pipe pressurization distally through the segment thereby decreasing the amount of radial forces exerted through the teeth.

As will be apparent to one skilled in the art, various modifications can be made within the scope of the aforesaid description. Such modifications being within the ability of one skilled in the art form a part of the present invention and are embraced by the claims below.

The invention claimed is:

1. A method of forming a seal between a spigot end of a first pipe and a bell end of a second pipe, the bell end including a throat and a gasket receiving groove, the method comprising:
    providing a gasket having a compressible body with a heel portion including a conical inner surface, a front face and an edge formed by the intersection of the conical inner surface and the front face, a sealing portion and a plurality of metal segments at least partially embedded in the heel portion, at least one of the metal segments of the plurality of metal segments including an outer radial surface, an inner radial surface, a nose portion formed by an intersection of the outer radial surface and the inner radial surface, the nose portion terminating at the edge of the heel portion, and at least one tooth extending radially inwardly from the inner radial surface,
    placing the gasket into the gasket receiving groove,
    inserting the spigot end into the bell end and through the gasket, followed by
    withdrawing the spigot end a distance through the gasket and wedging the nose portion between the throat and the spigot end.

2. The method according to claim 1 further comprising forming a load path extending between the at least one tooth and the throat.

3. The method according to claim 1 further comprising forming a first load path extending through the nose portion and between the throat and the spigot end.

4. The method according to claim 3 further comprising forming a second load path extending between the at least one tooth and the throat.

5. The method according to claim 1 wherein withdrawing the spigot end includes translating the at least one metal segment axially by pressurizing a joint formed by the first pipe and the second pipe.

6. The method according to claim 1 further comprising puncturing the edge of the heel portion with the nose portion.

7. A method of forming a seal between a spigot end of a first pipe and a bell end of a second pipe comprising:
    providing a compressible gasket having heel portion with a conical inner surface, a front face and an edge formed by the intersection of the conical inner surface and the front face and a metal segment embedded therein, the metal segment including a tooth extending radially inward and a nose that terminates at the edge of the heel portion,
    placing the compressible gasket into a gasket receiving groove of the bell end,
    inserting the spigot end into the bell end and through the gasket, followed by,
    moving the metal segment from a first position where the nose is not located between the spigot end and a throat of the bell end to a second position where the nose is located between the throat and the spigot end.

8. The method according to claim 7 further comprising moving the nose into the second position without rotating the metal segment about a portion of the bell end.

9. The method according to claim 7 further comprising forming a load path through the nose and between the spigot end and the throat.

10. The method according to claim 7 further comprising forming a load path through the metal segment between the tooth and a portion of the bell end located immediately adjacent to an edge of the throat.

11. A pipe joint comprising,
    a first pipe having a spigot end,
    a second pipe having a bell end with a throat section, and
    a pipe gasket including,
        a compressible body having a heel portion including a conical inner surface, a front face and an edge formed by the intersection of the conical inner surface and the front face, and
        a plurality of metal segments at least partially embedded in the compressible body and circumferentially spaced therein, at least one metal segment of the plurality of metal segments including a nose portion and a first tooth extending radially inward through the conical inner surface,
    wherein the nose portion terminates at the edge of the heel portion prior to insertion of the spigot end into the bell end and is wedged between the spigot end and the throat section after the spigot end is inserted into the bell end.

12. The pipe joint according to claim 11 wherein the at least one metal segment includes a second tooth, the first tooth and the second tooth being arranged to be coplanar.

13. The pipe joint according to claim 11 wherein the at least one metal segment has a substantially flat, inner face from which the first tooth extends radially inward.

14. The pipe joint according to claim 13 wherein the inner face extends parallel to the conical inner surface.

15. The pipe joint according to claim 13 wherein the nose portion includes an outer surface embedded in the compressible body, the outer surface extending distally from the edge and forming with the inner face an angle of about 15° to about 25°.

16. The pipe joint according to claim 11 wherein the nose is formed by a pair of surfaces arranged to form an angle of less than about 25°.

17. The pipe joint according to claim 11 wherein the nose if formed by a pair of surfaces arranged to form an angle of about 15° to about 25°.

18. The pipe joint according to claim 11 wherein the at least one metal segment includes at least one protrusion extending radially outward from an embedded outer surface thereof.

19. The pipe joint according to claim 11 wherein the compressible body includes a sealing bulb portion and a retaining groove surface located between the heel portion and the sealing bulb portion and wherein no portion of the at least one metal segment extends directly between the front face of the heel portion and the retaining groove surface.

20. The pipe joint according to claim 11 wherein, opposite to the edge, the at least one metal segment includes a rectangular portion from which the at least one tooth extends radially inward.

* * * * *